United States Patent [19]

Norris et al.

[11] 3,983,256

[45] Sept. 28, 1976

[54] PRECOOKED FARINACEOUS FOODS ADAPTED FOR MICROWAVE HEATING AND A SYRUP TOPPING THEREFOR

[75] Inventors: Helen R. Norris; Carolyn M. Niemand; David W. Andreas, all of Minneapolis, Minn.

[73] Assignee: The Pillsbury Company, Minneapolis, Minn.

[22] Filed: Feb. 10, 1975

[21] Appl. No.: 548,320

[52] U.S. Cl. ................................. 426/94; 426/115; 426/122; 426/124; 426/128; 426/570
[51] Int. Cl.² ........................................ A21D 13/00
[58] Field of Search .......... 426/613, 658, 659, 660, 426/573, 576, 570, 106, 107, 109, 112–115, 122, 124, 128, 130, 234, 237, 94

[56] References Cited
UNITED STATES PATENTS

| | | | |
|---|---|---|---|
| 2,951,765 | 9/1960 | Robson | 426/113 |
| 2,987,402 | 6/1961 | Dold | 426/106 |
| 3,163,543 | 12/1964 | Gorfinkle | 426/576 |
| 3,190,757 | 6/1965 | Underwood, Sr. et al. | 426/659 X |
| 3,222,185 | 12/1965 | Yueh | 426/659 X |
| 3,362,833 | 1/1968 | Smith | 426/658 |
| 3,434,849 | 3/1969 | Carbone | 426/130 X |
| 3,542,569 | 11/1970 | Farquhar | 426/115 |
| 3,549,383 | 12/1970 | Menzies | 426/659 X |
| 3,663,239 | 5/1972 | Rowe et al. | 426/113 |
| 3,865,301 | 2/1975 | Pothier et al. | 426/107 X |

*Primary Examiner*—Frank W. Lutter
*Assistant Examiner*—William Cuchlinski, Jr.
*Attorney, Agent, or Firm*—James V. Harmon; Michael D. Ellwein

[57] ABSTRACT

Stacked pancakes or other farinaceous griddle food is described. Between adjacent pancakes is a layer of sugar syrup in a plastic but non-fluid condition and preferably whipped to provide a foam structure. The stack is packaged within a container such as a six sided box having an odor and flavor blocking exterior overwrap. A syrup barrier is provided on the inside of the box to prevent the syrup from soaking into the box.

16 Claims, 8 Drawing Figures

PRECOOKED FARINACEOUS FOODS ADAPTED FOR MICROWAVE HEATING AND A SYRUP TOPPING THEREFOR

FIELD OF THE INVENTION

The invention relates to stacked farinaceous food products suited for heating in a microwave oven and to a syrup topping for the farinaceous food. The invention is particularly useful in connection with a stack of pre-cooked griddle foods.

THE PRIOR ART

The soaring demand for convenient inexpensive food products that can be quickly heated to serving temperature in a microwave oven is increasing each year. While a number of products are suited for heating in a microwave oven, pre-cooked pancakes and other pre-cooked farinaceous griddle foods do not lend themselves well to this application. For convenience, pancakes will be referred to specifically herein, but it should be understood that french toast and waffles are considered equivalents.

A primary problem is in finding a way to provide a maple syrup or fruit syrup topping. The problem is made more difficult since maple and fruit syrup are not a solid at refrigerated or frozen temperatures. Therefore, when applied to a pancake, the syrup tends to run off or soak into the pancake. If it soaks into the pancake, the texture of the pancake is destroyed. The pancake becomes soggy, loses strength and assumes a character which is unlike that associated with fresh pancakes. While syrup can be applied after the pancakes have been heated, the performance of this additional step is an inconvenience and a separate container must be provided to store the syrup prior to its application.

It was also discovered in the course of the development of the invention that plain uncoated pancakes do not keep as well as those prepared in accordance with the present invention because moisture loss causes them to become rubbery or mealy. In addition, the application of microwave energy to heat the pancakes with no syrup present causes hot and cold spots and warming takes more time.

OBJECTS OF THE INVENTION

The major objects are (a) to find a way to provide a package of pre-cooked pancakes or other farinaceous griddle food without having to apply syrup or other sugar containing topping as a separate operation after heating, (b) to provide a stack of pancakes or the like ready for heating in a container which serves as a shipping, storage and heating container, (c) to provide a stack of pancakes ready for heating with syrup pre-applied, (d) provision for causing the pancakes to absorb microwave energy faster and more uniformly than plain pancakes, (e) the provision of a pancake with the syrup or sugar based topping which stays in place after being applied and before heating, (f) the provision for syrup topped pancakes in which the syrup is distributed so as to help absorb microwave energy over a wide area, (g) provision for preventing the absorption of odors and flavors during storage, (h) a provision for preventing the absorption of syrup by the packaging material and (i) the provision of a foamed syrup topping for stacked farinaceous foods.

THE FIGURES

FIG. 1 is a perspective view of a package embodying the invention before being opened, FIG. 2 is a perspective view of the same package after the outer wrapper has been removed, FIG. 3 is a horizontal cross sectional view taken on line 3—3 of FIG. 2, FIG. 4 is a vertical sectional view taken on line 4—4 of FIG. 2, FIG. 5 is an elevational view of a microwave oven used for heating the package, FIG. 6 is a perspective view of the package after heating with the pancakes as they appear just prior to being eaten, FIG. 7 is a view of the carton blank on a reduced scale, and FIG. 8 is a plan view of a pancake with a modified form of topping.

SUMMARY OF THE INVENTION

The invention concerns pre-cooked farinaceous griddle food comprising pancakes, waffles or french toast with a syrup topping suited for heating in a microwave oven. More specifically, the invention comprises a stack of precooked packaged pancakes, waffles or french toast, typically three or four of them one above the other, to which is applied a sugar base topping in a plastic nonfluid condition. The topping comprises a nonfluid sugar syrup comprising about 35 to 65 percent sugar by weight, about 8 to 45 percent by weight water and about 10 to 40 percent fat. It is preferably but not necessarily aerated by whipping to reduce penetration of the syrup into the farinaceous food product. The topping is preferably layered between each adjacent pancake in the stack. A layer is also applied to the upper surface of the top pancake. Each layer of topping is distributed over most of the upper surface of each pancake. The stack of pancakes is enclosed in a shipping and heating container which preferably comprises a folded paperboard carton. In a preferred form of the invention, the carton is formed from a single sheet of paperboard having side walls with flaps or webs folded centrally between adjacent side walls to function as a leak proof serving tray or dish. An overwrap can be provided to help prevent the food product from absorbing odors or flavors.

While the invention is applicable to pancakes, french toast and waffles, it will be described by way of example in connection with pancakes. The term farinaceous griddle food has been selected to refer to pancakes, french toast and waffles.

DETAILED DESCRIPTION OF THE INVENTION

Figure 1:
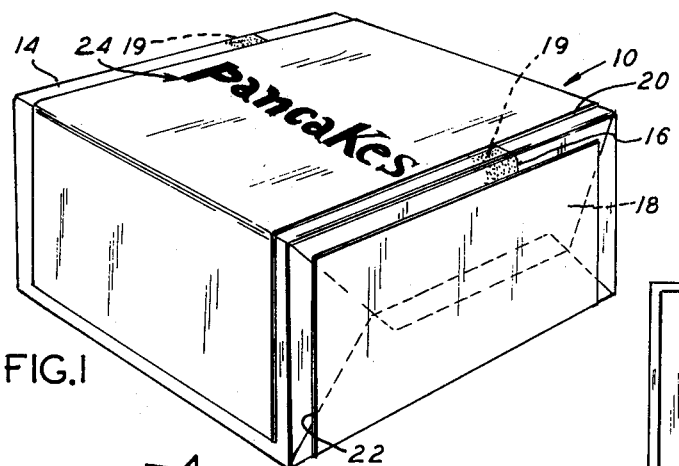

In the figures is shown a packaged stack of pancakes indicated generally at 10 which includes a container or enclosure comprising a paperboard carton 12 over which is applied an outer wrapper 14. Within the carton 12 is a plurality of pancakes stacked one above the other as shown at 15. Between the pancakes 15 and on the upper surface of the top pancake is a layer of a sugar based topping such as a syrup topping 17.

The pancakes 15 are entirely cooked i.e. cooked sufficiently to set the crumb structure and preferably browned on the surface. The pancake formulation can be varied but the particular formula used should, of course, be chosen for lightness, color, texture, flavor, and should be able to withstand freezing and later storage under refrigerated conditions with minimum amount of textural or flavor degradation. One pancake or waffle formula that has been used successfully is set forth below. The invention is not, however, limited to a particular pancake batter formulation since numerous changes can be made to optimize various performance criteria such as texture, flavor, cost, volume, resistance to shrinking during storage, etc. In a preferred form of the invention the $a_w$ of the finished pancake is held between about 8.8 and 9.6 and preferably between about 9.0 and 9.2 by the addition of edible water absorbing materials known to the art to limit growth. Examples of such materials are monosaccharides, edible salts, polyols etc. It is preferred that the $a_w$ of the food should match the syrup to prevent water migration during storage. Thus, if the $a_w$ of the pancake is 9.0 the $a_w$ of the syrup should also be 9.0.

One pancake formula that performed well is as follows:

| | % by Weight |
|---|---|
| Wheat Flour | 75.00 |
| Egg Albumen (dry) | .65 |
| Egg Yolk (dry) | .50 |
| Shortening | 5.00 |
| Chemical Leavening (anhydrous monocalcium phosphate, soda and sodium aluminum pyrophosphate) | 3.40 |
| Buttermilk Solids | 3.00 |
| Salt | 1.40 |
| Sucrose | 8.00 |
| Dextrose | 3.00 |
| | 100.00% |

The farinaceous breakfast griddle food can also be french toast made with bread and eggs in the usual way or waffles made from the above batter.

The topping layers 17 comprise a plastic sugar syrup that will not flow appreciably during storage. The syrup is a sugar syrup containing an edible emulsified fat. One way to prevent the syrup from flowing is to incorporate in it a gelling agent such as any edible hydrophillic colloid, examples of which are proteins such as gelatin, gluten, caseine, and edible salts thereof, as well as other milk proteins such as solubilized whole milk protein which consists of a mixture of caseine and lactalbumen. Other proteins include powdered wheat germ protein, non-fat dry milk, whole egg, pea flour, bean flour, corn germ, fish protein, soybean protein and bran protein.

Non-proteinaceous gelling agents comprise polysaccharide hydrophilic gelling agents adaptable to the present invention that have the physical characteristics of being hydrophilic colloid forming, water-dispersable organic solvent-phobic (i.e., generally insoluble in organic liquids) and amorphous. Upon addition to water, those hydrophilic film formers have the characteristics of balling or agglomerating and/or forming thick, sticky masses even in the presence of very large quantities of water. In general, the employable hydrophilic film formers have a molecular weight greater than 10,000 and when added to water they ball or form lumps in which there is a pasty skin of wetted hydrocolloids enclosing a core of dry gum. The hydrophilic film formers have a tendency to agglomerate (i.e., clump and form soft, semisolid masses in water).

Both naturally occurring and synthetically produced polysaccharide gelling agents may be employed in the present syrup. Illustrative polysaccharides include the water dispersible cellulose derivatives such as sodium carboxymethyl cellulose, hydroxypropylmethyl cellulose ether, carboxymethyl cellulose, hydroxypropylethyl cellulose ether, hydroxypropyl cellulose ether, the tree and shrub extracts such as tragacanth, arabic, ghatti, furcelleran and the salts of furcelleran (sodium, calcium, potassium and ammonium salts), karays, seaweed colloids such as agar, carrageenin and the salts thereof (e.g., ammonium, calcium, potassium and sodium salts) the alginates (e.g., the calcium, potassium, sodium alginates and propylene glycol alginates), gelatinized starches and starch derivatives (e.g. hydroxypropyl starch, modified starches such as those treated with succinic anhydride, sodium hydroxide, aluminum sulfate, dextrin including corn syrups containing dextrin, etc.); pectins such as citric pectin, low methoxyl pectin and sodium pectinate; seed extracts such as locust bean, quince, oat gum and guar gum and other gumlike natural and synthetic hydrophilic colloids such as dextran and certain biologically produced polysaccharides such as disclosed in U.S. Pat. No. 3,301,848 by Frank E. Halleck; *Xanthamonas compestris* produced polysaccharides such as disclosed in the *Canadian Journal of Chemistry*, volume 42 (1964), pages 1261–1269, mixtures of hydrophilic colloids and the like. Advantageously, polysaccharide gelling agents having a molecular weight in excess of 50,000 and perferably in excess of 100,000 are employed.

The amount of hydrophilic gelling agent employed in the present syrup will vary considerably depending upon the particular type of hydrophilic gelling agent employed. Accordingly, certain hydrophilic gelling agents on a given weight basis will provide greater gel forming properties than others. In general, those hydrophilic gelling agents capable of providing a more viscous, aqueous solution on a given weight basis can be used in smaller amounts. In addition to the hydrophilic gelling character of the specific agent employed, the solids-to-water ratio has an effect upon the flow properties thereof. Syrups having a higher solids-to-water ratio require less gelling agents than those having a lower ratio thereof. In any event, when a gelling agent is used, the amount used should be about the minimum amount effective to render the syrup substantially nonfluid during storage. This can be determined by evaluation after storage at 40°F. for two weeks. The syrup should show no significant flow after this time.

The sugar component of the syrup can be either a mono or disaccharide usually corn syrup and sufficient sucrose for the desired degree of sweetness or other suitable syrup such as natural maple syrup or honey. If honey is used any commercially available whipped or spun honey can be used provided it is rendered plastic but nonfluid. The term sugar herein refers to either mono or disaccharides.

One suitable topping composition is a dispersion of margarine, water, sucrose and glucose together with a gelling agent such as unflavored gelatin and carboxymethyl cellulose in a ratio of about 2 to 1. One example is as follows:

| Maple Flavored Syrup | |
|---|---|
| | % by Weight |
| Margarine | 30.0 |
| Unflavored Gelatin | 0.5 |
| Carboxymethyl Cellulose | 0.2 |
| Water | 9.0 |
| Maple Flavor | 0.5 |
| Powdered Sucrose | 12.0 |

-continued

| Maple Flavored Syrup | |
|---|---|
| | % by Weight |
| Corn Syrup (Liquid) | 47.8 (11.5% water, 36.3% solids) |

All percentages and quantities presented herein are expressed by weight. The dispersion is whipped to produce a form structure.

Another suitable composition that can be used to provide an apple cinnamon flavored topping has the following composition:

| Apple Topping | |
|---|---|
| | % by Weight |
| Margarine | 28.0 |
| Unflavored Gelatin | .4 |
| Carboxymethyl Cellulose | .2 |
| Water | 8.0 |
| Cinnamon | .15 |
| Sugar | 9.0 |
| Corn Syrup (Liquid) | 42.0 (10% water, 32% solids) |
| Prepared Apple Pie Filling | 12.25 |

If the syrup composition itself is nonfluid, a gelling agent is unnecessary. A syrup composition that does not use a gelling agent is as follows:

| Maple Flavored Syrup | | |
|---|---|---|
| | Exemplary Range | General Range |
| Sucrose | 50–55% | 35–65% |
| Water | 26–30% | 25–45% |
| Fat (e.g. a mix of hydrogenated soy and cottonseed oil; plastic between 70°F. and 100°F) | 18–22% | 10–30% |
| Emulsifiers (e.g. equal amounts of Tweens and monoglycerides) | 1–2 | .5–5% as needed |
| Flavor | 2–3 | .5–5% as needed |
| | 100% | 100% |

Figure 8:
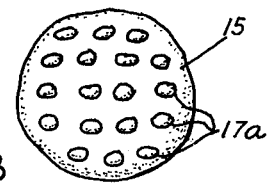

The materials contained in each topping are assembled in the usual way and the first two listed above are whipped to promote the incorporation of air and thereby form a stable foam. The topping is then spread on the pancakes. Spreadability is not essential providing the topping has the following characteristics: (a) the capability of assuming and retaining its shape at room temperature i.e. is non-fluid and (b) can be molded or otherwise formed into a sheet that can be placed on top of each of the pancakes to form a thin layer which substantially covers each pancake. The layer need not, however, be an uninterrupted continuous layer of topping, for example as shown in FIG. 8, the topping may be applied as a series of spaced dots or globs 17a. This mode of application is preferred when the topping is initially in an extrudable plastic condition and is applied automatically. Application can then be carried out by extruding the topping through a multiplicity of openings onto each of the pancakes to provide small dots of toppings 17a which together can be thought of as a layer. Later upon heating, the topping 17a melts, all of the dots will coalesce. Thus, the term "layer" as used herein does not necessarily mean a continuous uninterrupted layer and can comprise a layer formed from spaced apart pieces of topping.

The topping 17 will remain in place throughout refrigerated storage and shipment period of several days or weeks without the topping being absorbed into the pancakes and without running down to the bottom of the package 10. In short, it will stay in place and have almost no effect upon the consistency of the pancakes. On the other hand, when heated in a microwave oven, the topping will quickly melt and trickle down over and around the pancake to thus provide a familiar syrup consistency and will have the appearance of freshly prepared pancakes which has a buttered syrup poured over them.

Although a variety of different shipping containers can be employed, it is preferred that the package serve also as a plate and have a degree of structural strength sufficient to protect the pancakes and topping. Thus a semi-rigid container is preferred e.g. a carton formed from paperboard (or plastic which will not be damaged by heat) having a degree of rigidity greater than that of a paper bag which would allow the pancakes to become crushed during shipment or storage.

As seen in the figures, the paperboard carton comprises bottom, side and top panels including a bottom wall 30 with side walls 32, 34, 36 and 38 which are joined at the corners of the carton by integral centrally extending tucks or folds F which are frequently referred to in the trade as web folds to prevent leakage of the syrup after heating, a top 40 having a rip opening strip 42 defined by transverse tear lines 44 and 46 and a locking tab T which extends into a suitable slot 48.

An overwrap sheet 14 comprises a tube formed from a suitable film or sheet material which is resistant to the transmission of odors, flavor and moisture. A cellophane or saran sheet 14 having a longitudinally extending seam 15 sealed together at 19 is suitable. The ends of the tube are folded and pasted down against the side of the underlying paperboard carton 12 as shown at 18. Labels 20 and 22 can be pasted over the wrapper 14 and suitable descriptive and pictorial information 24 can be applied to the labels 20 and 22. If the wrapper is printed, the labels will not be needed. Within the carton on at least the bottom of the carton is a liner such as a suitable odor free heat resistant varnish or a plastic film 50 of polyester, for example, to reduce absorption of the hot syrup by the paperboard used in the carton or absorption of paperboard flavor by the cakes.

After being assembled, the filled packages are distributed in a frozen condition but before they are to be dispensed they are usually placed in a vending machine at refrigerated but not frozen conditions. They may be kept there for several days before being dispensed.

Figure 5:
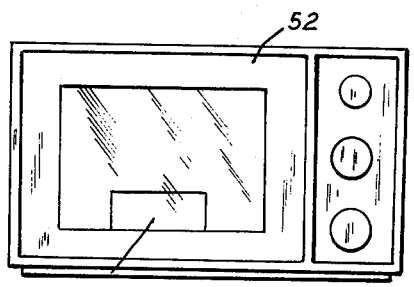
Figure 2:
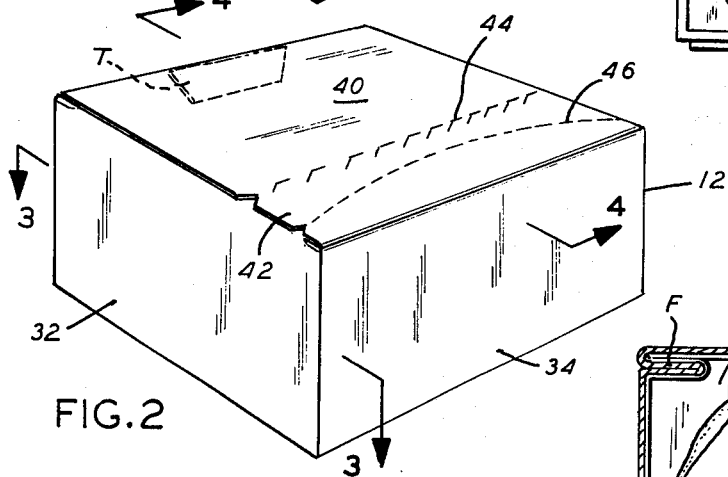
Figure 4:
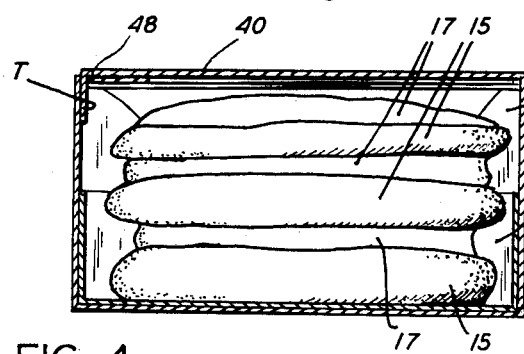
Figure 3:
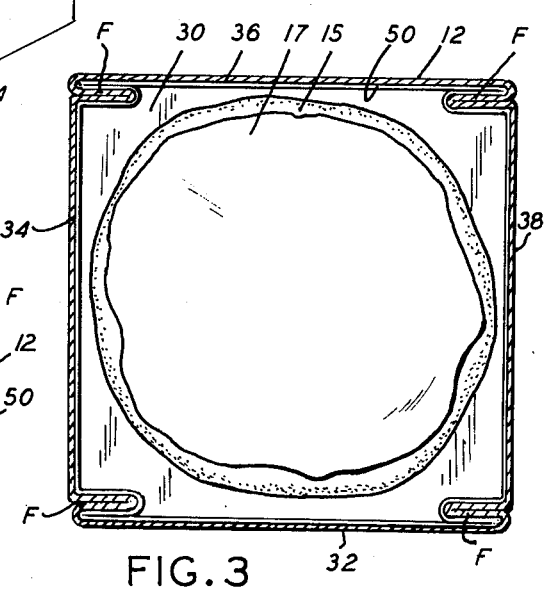
Figure 6:
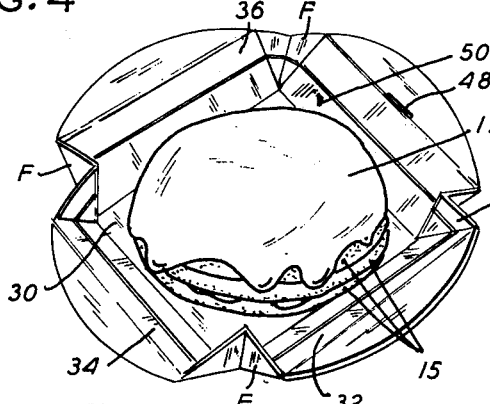
Figure 7:
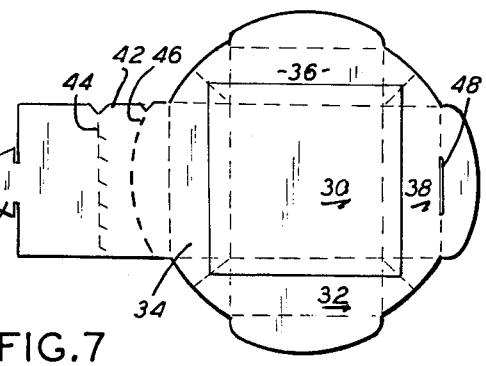

After being dispensed, the wrapper 14 is removed and the entire container 12 is introduced into a microwave oven 52 as shown in FIG. 5. It is usually heated for about 30 seconds assuming a 650 watt microwave oven until the syrup is melted and runs as indicated in 17b down the sides of the stack. The tab 42 is then pulled to open the container. The pancakes are then served as shown in FIG. 6. The container thus has a three-fold purpose since it functions as a shipping container, a heating container and as a dish or serving receptacle from which the pancakes can be directly eaten. It has been observed that most of the energy is absorbed by the syrup. It was found that by distributing the plastic syrup widely over and through the stack of pancakes two important benefits were obtained, first, heating was more uniform and second, heating the pancakes to the correct temperature for eating took less time. This again shows the importance of maintaining the topping in a nonfluid condition.

In a typical application, three pancakes are used having a total weight of 72 grams with 60 grams of topping. The topping is preferably used in an amount of from about 0.5 to 2 parts for each one part by weight of pancakes preferably from about 0.8 to 1 parts for each 1 part of pancakes. The amount of topping used is, of course, important in determining the heating time and distribution of the microwave energy throughout the stack.

What is claimed is:

1. A packaged food product adapted to be heated in a microwave oven comprising a stack of cooked breakfast griddle food units selected from the group consisting of pancakes, waffles and french toast having a soft porous crumb structure, a layer of syrup topping at least on top of the top food unit in the stack, the topping comprising sugar in the amount of from 35 to 65 percent by weight from about 8 to 45 percent by weight of water, and 10 to 40 percent fat by weight, said topping being in a nonfluid condition and being meltable to the fluid condition by the application of the heat from a microwave oven and a semi-rigid combination shipping and heating container enclosing the stack.

2. The product of claim 1 wherein the food unit is pancakes and the topping has a maple syrup flavor.

3. The product of claim 1 wherein the container includes lining means comprising a plastic film within the bottom thereof to prevent the syrup from being absorbed by the container during heating and the package is enclosed in a wrapper means formed from a material resistant to the transmission of odors.

4. The food product of claim 1 wherein the stack of breakfast griddle food units comprises french toast.

5. The product of claim 1 wherein the container comprises a folded paper carton having a bottom wall, four vertically disposed sidewalls, centrally folded integral webs between the side walls, a top wall integral with one of the side walls and secured at its free end to the opposite side wall.

6. The food product of claim 1 wherein the shipping and heating container comprises a paperboard carton with a plurality of panels having a rip strip in one panel thereof adapted to be removed manually to facilitate quick opening of the package after heating.

7. The product according to claim 6 wherein the carton has applied over it a wrapper formed from flexible plastic sheet material resistant to the transmission of odors for reducing the absorption of odors and flavors during storage.

8. The food product of claim 1 wherein the topping comprises sugar solids about 50–55 percent by weight, water about 26–30 percent by weight, and fat about 18–22 percent by weight.

9. The product of claim 1 wherein the topping is whipped.

10. The product of claim 1 wherein the topping is rendered non-fluid by the incorporation therein a gelling agent comprising an edible hydrophilic colloid.

11. The food product of claim 1 wherein the food units comprise pancakes and the syrup topping comprises a syrup composed of about 30 percent by weight margarine, about ½ of 1 percent by weight gelatin, about 2/10 of 1 percent by weight carboxymethylcellulose, about 9 percent by weight water, about 60 % by weight, syrup, comprising mono and di saccharides and the syrup is whipped to incorporate air therein to thereby convert the syrup to a stable foam.

12. The food product of claim 1 wherein the shipping and heating container comprises a paperboard carton having a liner means comprising a polyester plastic film adhered to the inner surface thereof on at least the bottom portion of the carton to prevent the syrup from being absorbed by the paperboard during the heating thereof, the carton includes a horizontal bottom wall, four vertically disposed side walls, inwardly extending web folds at the corners thereof between the mutually adjacent side walls thereof, a hinged top wall integral with one of the side walls and a means for securing the free end of the top wall to the upper end of the opposite side wall.

13. The product of claim 1 wherein the shipping and heating container comprises a paperboard carton having a bottom wall, side walls, top wall hinged to the upper edge of one of the side walls and the top wall is removable to provide a serving container to hold the food product while it is being eaten after the top wall has been removed therefrom.

14. The packaged food product of claim 1 wherein the topping is in a non-fluid condition at room temperature and is melted to a fluid condition within the oven when heat is applied to bring the food product to a temperature on the order of that of freshly prepared pancakes.

15. The food product of claim 1 wherein the $a_w$ of the finished food product is between about 8.8 and 9.6.

16. The packaged food product of claim 15 wherein the $a_w$ of the syrup topping is substantially equal to the $a_w$ of the food product.

* * * * *